10. FURNACES.
Spark arresters,
Furnace conductor.
BEST AVAILABLE COPY
D. Matthew.
Spark Arrester.
No. 356. Reissued Feb. 20. 1856.
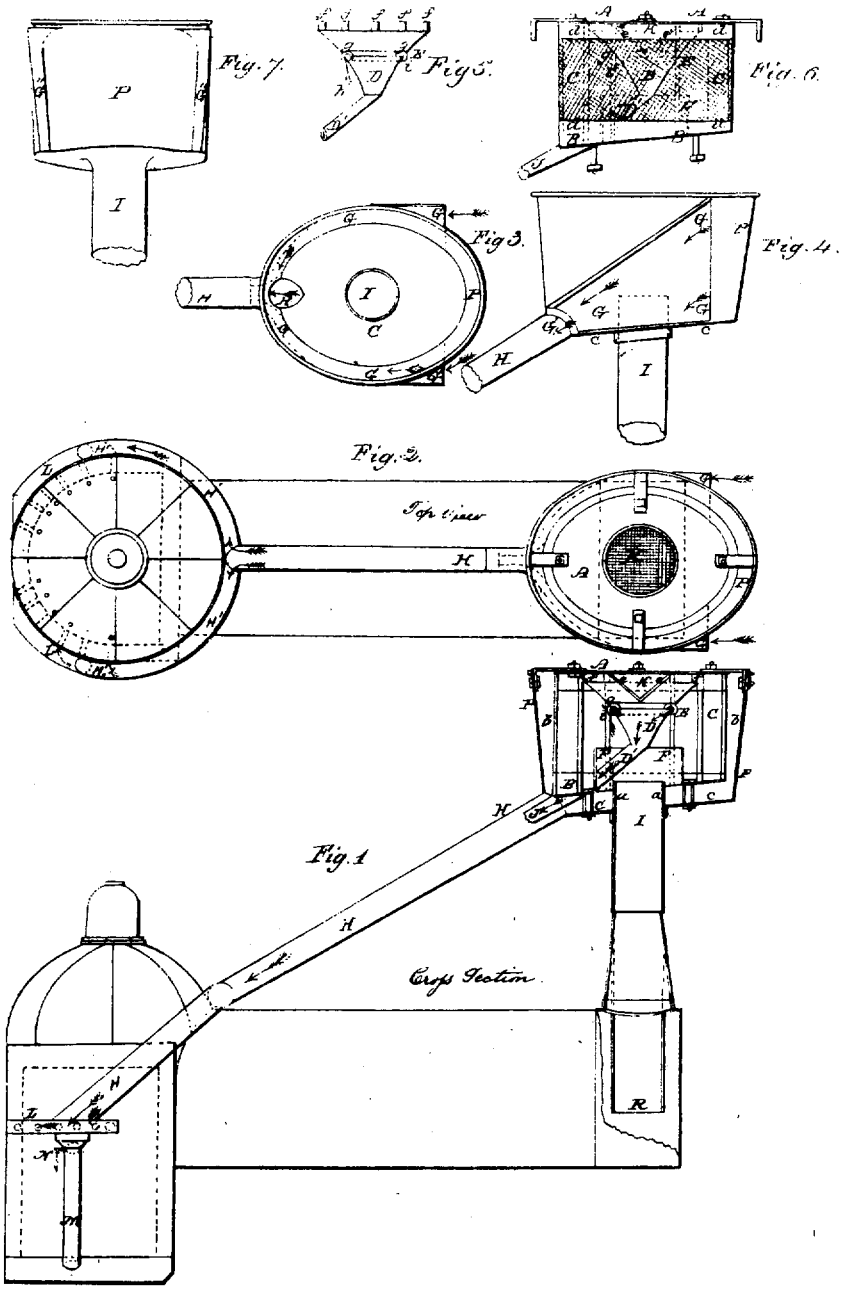
Witnesses.
Charles D. Freeman
John L. Frederick
Inventor.
David Matthew

UNITED STATES PATENT OFFICE.

DAVID MATTHEW, OF PHILADELPHIA, PENNSYLVANIA.

IMPROVEMENT IN SPARK AND GAS CONSUMERS.

Specification forming part of Letters Patent No. 6,116, dated February 20, 1849; Reissue No. 248, dated October 4, 1853; Reissue No. 356, dated February 26, 1856.

*To all whom it may concern:*

Be it known that I, DAVID MATTHEW, formerly of the city of Baltimore, in the State of Maryland, now of the city of Philadelphia, in the State of Pennsylvania, have invented certain new and useful improvements in the manner of constructing a machine to be used on locomotive steam-engines, for the purpose of conveying off the sparks from the engine and preventing their escape out into the air, and of causing their consumption, together with that of a portion of ignitible gas, and of aiding in the generating of steam; and I do hereby declare that the following is a full and exact description thereof.

The nature of my invention consists in combining an outer or receiving case, shield, or plate-head and filterer with and on top or over a sectional chimney enlarged at the base which rests on the smoke-box of the engine beyond the diameter of the upper part of a section extending vertically into the smoke-box near to the lower horizontal flues of the boiler, and near to the sparks that lie in the bottom of the smoke-box, to convey the sparks off from the engine, increase the generation of steam, and arrest the sparks, notwithstanding the increased force of the chimney; also, in aiding in the generation of steam by increasing the base of the chimney, which rests on the smoke-box, beyond the diameter of the upper end of its section extending vertically to near the lower horizontal flues, to more uniformly support the draft between the upper and lower flues; also, in turning the sparks from the top of the chimney inwardly into the inside of a conical or trumpet-mouthed tube, and in conducting the sparks and a portion of the gas, with atmospheric air, into the furnace, to be consumed by the means to be presently described.

In the accompanying drawings, Figure 1 is a side elevation of a locomotive-boiler, with the usual horizontal flues and fire-box, the sectional chimney and apparatus which is placed on the top thereof being shown in section. (The upper part of the chimney and apparatus being shown in section, and the lower portion of the chimney with the boiler and fire-box in perspective in the drawings of the original filed in the office on the second of August, 1847.) Fig. 2 is a top view of the same, showing the shield or head and filterer with the outer case, and also the conducting-pipes leading to the furnace. Fig. 3 is a top view of the outer case. Fig. 4 is a side elevation of the outer case. Fig. 5 is a side view of the trumpet-mouthed tube. Fig. 6 is a side view of the apparatus that is to be contained within the outer case.

The chimney I, with its lower section, R, stands vertical, with the base of the part I resting on the smoke-box, and enlarged beyond the diameter of the upper end of section R, which extends vertically down near the lower horizontal flues and to within about fifteen inches of the bottom of the smoke-box. This enlarged base forms at the top of the smoke-box a space between the two sections, in the same manner and kind as is formed between the sections on the upper part of my chimney described in my patent, dated December 31, 1840, and extended for seven years, giving at this position the additional effects of taking up the heavy sparks from the lower flues and bottom of the smoke-box to be arrested, and aiding in the generating of steam by equalizing the draft between the lower and upper flues; (also, like the said old sectional chimney, it prevents the reaction of the draft on the flues and furnace between the pulsations or beats of the exhaust, and relieves the draft of the engine while standing or firing up.) The exhaust-pipes present their mouths below this opening of the chimney, directed upward, and discharge the exhaust-steam up the chimney, up which it passes from one section to the other in the same manner as in the chimney of my said spark-arrester patented in 1840. With the section of the chimney formed at the top of the smoke-box, the receiving-case, shield, or head, and filterer, must be combined with the top of the chimney and not between the top and the base. A receiving-case, shield, plate, and filterer such as patented by L. Phleger, assignee, in June, 1841, or the receiving-case and filterer known as the "Shultz arrester," being between the top and base of the chimney, would destroy the volume of the exhaust and draft of this chimney, and by its increased force the gauze bonnet would be destroyed. While the chimney alone without the shield or head and filterer will throw out more fire with greater force than the old chimney, and this arresting apparatus alone without the sectional chimney will leave the heavy sparks of bituminous coal in the lower flues and smoke-box to injure the engine, the arresting apparatus consisting of the shield or head-plate, filterer or gauze, and receiving or outer case must be combined with the top of this sectional chimney to give the beneficial results without being pernicious. The outer case, P P, has a bottom, C C, firmly riveted to the chimney I, that enters it to the height, say, of six inches, as shown at *a a*, Fig. 1. Over this chimney is a top plate or shield, A A, against which the sparks are forced from the chimney in their ascent. In a portion of this plate is a wire-gauze or filterer, K, through which most of the steam escapes. The sparks after striking the head fall back on a lower plate, B B, having a flange, *d*, rising from it forming a basin to hold the sparks. Another flange, *d*, descends from the upper plate or head, the two being connected by rods and surrounted by wire-gauze within the outer case, the same as in my said spark-arrester patented in 1840. The bottom plate B B has an inclination, say, of four or more inches from its forward to its rear end toward the pipe J that enters the pipe H at G, it being considerably smaller than the pipe H. The bottom plate B B may be about five inches above the bottom plate C C, Fig. 1, which is parallel to it. D D is the trumpet-mouthed pipe. (Shown separately in Fig. 5.) The upper portion or mouth of this stands immediately below an opening, K, in the head A, which opening may be about fifteen inches in diameter, and is to be closed or covered with wire-gauze or a filterer forming an obtuse inverted cone, as shown by the lines *e e*, Figs. 1 and 6. The trumpet-mouthed tube is not in contact with the plate A A, but is connected to it by short rods or studs, *f f*, Figs. 1 and 5, so as to allow a space between them. The trumpet-mouthed portion of this tube consists of two parts, divided horizontally from each other near to its upper end, as at E, Figs. 1, 5, 6. To the upper portion is attached a curved flange, E, Figs. 1, 5, which is in the form of the upper section of a tubular ring divided horizontally through its middle, and between the two sections of the trumpet-mouthed tube there is a passage, as indicated by the arrow *h* E, Fig. 5, through which the draft and sparks may pass from the outside inwardly to the inside of said trumpet-mouthed tube, the curvature of the flange *g* E, Figs. 1, 5, serving to direct said sparks directly down toward the tube D′, through which they are forced by the exhaust-steam into the tube H, the open end of D′ being opposite to the tube J. The two sections of the trumpet-mouthed tube D are connected together at intervals by short studs or thimbles. The tube H when it meets the boiler divides into two branches, H′ H′, Fig. 2. These branches each enter a hollow box or case, L, made fast to the outside of the fire-box. From these cases there are holes made into the interior of the fire-box, as shown by the dotted lines *o o o*, Fig. 1. Of these there may be twelve, or any other preferred number, each of which may be about an inch and a half in diameter. From the under sides of the cases L descends a tube, M, that enters the ash-pan, and at the upper end of this tube there is a valve, N, which may be opened or closed at pleasure. The use of this is to carry off the water, which, when the engine is foaming, may be carried into the case, and which, without the provision of the pipes M, would pass into the fire; but by opening the valve N it will be thrown into the ash-pan without injuring the fire. The forward motion of the engine causes tubes G G, attached to the outside of the case, to operate as blowers in driving the sparks and gas through the tube H, supplying the oxygen necessary to their perfect combustion. To effect this, these tubes G G are flattened, so as to leave a space of two inches, more or less, between them and the outer case, but widening out at their forward termination, where they are open, as seen at G″ G″, Fig. 7, which shows their forward ends. These tubes, on each side of the case, meet at its rear end and enter the tube H, as shown at G, Fig. 4, leaving a space in the center for the entrance of the sparks and gas from the arresting-case.

What I claim is—

1. The combination of the receiving-case, shield-plate or head, and filterer, with and over the top of the sectional chimney, with enlarged base and smaller section in the smoke-box to convey off and arrest the sparks without pernicious effect, as described.

2. Increasing the base of the chimney beyond the diameter of the upper end of the section, extending vertically to near the lower horizontal flues and bottom of the smoke-box, to aid in the generation of steam, as described.

3. The trumpet-mouthed tube over the chimney, said tube being divided into two or more parts, to collect sparks and direct them inwardly by aid of the opening between said parts, as described.

4. The manner in which I connect the case at the top of the chimney with the furnace or fire-box, by means of the tubes or pipes G G and H, the cases L L, and the openings thence into the fire-box or furnace, to carry the sparks and gas to the furnace to be consumed, as described.

DAVID MATTHEW.

Witnesses:
JACOB STOUT,
CHARLES D. FREEMAN.